United States Patent [19]

Clements et al.

[11] 4,123,357
[45] Oct. 31, 1978

[54] RECOVERING OIL FROM EMULSION BY STIRRING, HEATING, AND SETTLING

[75] Inventors: Luther D. Clements, Lubbock, Tex.; Michael D. Hannan, Scotch Plains, N.J.; Robert J. Hinds, San Rafael; Richard W. Vose, Oakland, both of Calif.

[73] Assignee: Chevron Research Company, San Francisco, Calif.

[21] Appl. No.: 809,134

[22] Filed: Jun. 22, 1977

[51] Int. Cl.$^2$ .............................................. C02B 1/02
[52] U.S. Cl. ...................................... 210/71; 210/74; 210/84; 210/DIG. 25
[58] Field of Search ................ 210/43, 56, 71, 72, 210/74, 83, 84, 177, 178, 179, 219, 523, 524, 528, DIG. 25, DIG. 26, DIG. 27

[56] References Cited

U.S. PATENT DOCUMENTS

| 1,405,124 | 1/1922 | Harris | 210/43 |
|---|---|---|---|
| 1,972,454 | 9/1934 | Manley et al. | 210/179 |
| 2,318,714 | 5/1943 | Robertson | 210/43 |
| 3,405,059 | 10/1968 | Sprow | 210/84 |
| 3,650,950 | 3/1972 | White | 210/219 |
| 3,696,021 | 10/1972 | Cole et al. | 208/13 |
| 3,711,400 | 1/1973 | Cole et al. | 210/71 |
| 3,731,801 | 5/1973 | Hess et al. | 210/56 |
| 3,756,959 | 9/1973 | Vitalis | 210/43 |
| 3,909,407 | 9/1975 | Heisey | 210/56 |
| 3,929,586 | 12/1975 | Slikkers | 210/71 |
| 4,027,685 | 6/1977 | Heard et al. | 210/43 |
| 4,038,182 | 7/1977 | Jenkins | 210/DIG. 25 |

FOREIGN PATENT DOCUMENTS 639,053  2/1964  Belgium .................................. 210/43

Primary Examiner—Thomas G. Wyse
Assistant Examiner—Ernest G. Therkorn
Attorney, Agent, or Firm—D. A. Newell; R. H. Davies; D. L. Hagmann

[57] ABSTRACT

A process for recovering oil and deoiled solids from a sludge by steps including stirring and heating with a substantial input of mechanical energy, followed by sedimenting the solids by holding the heated mixture in a settling vessel.

8 Claims, 1 Drawing Figure

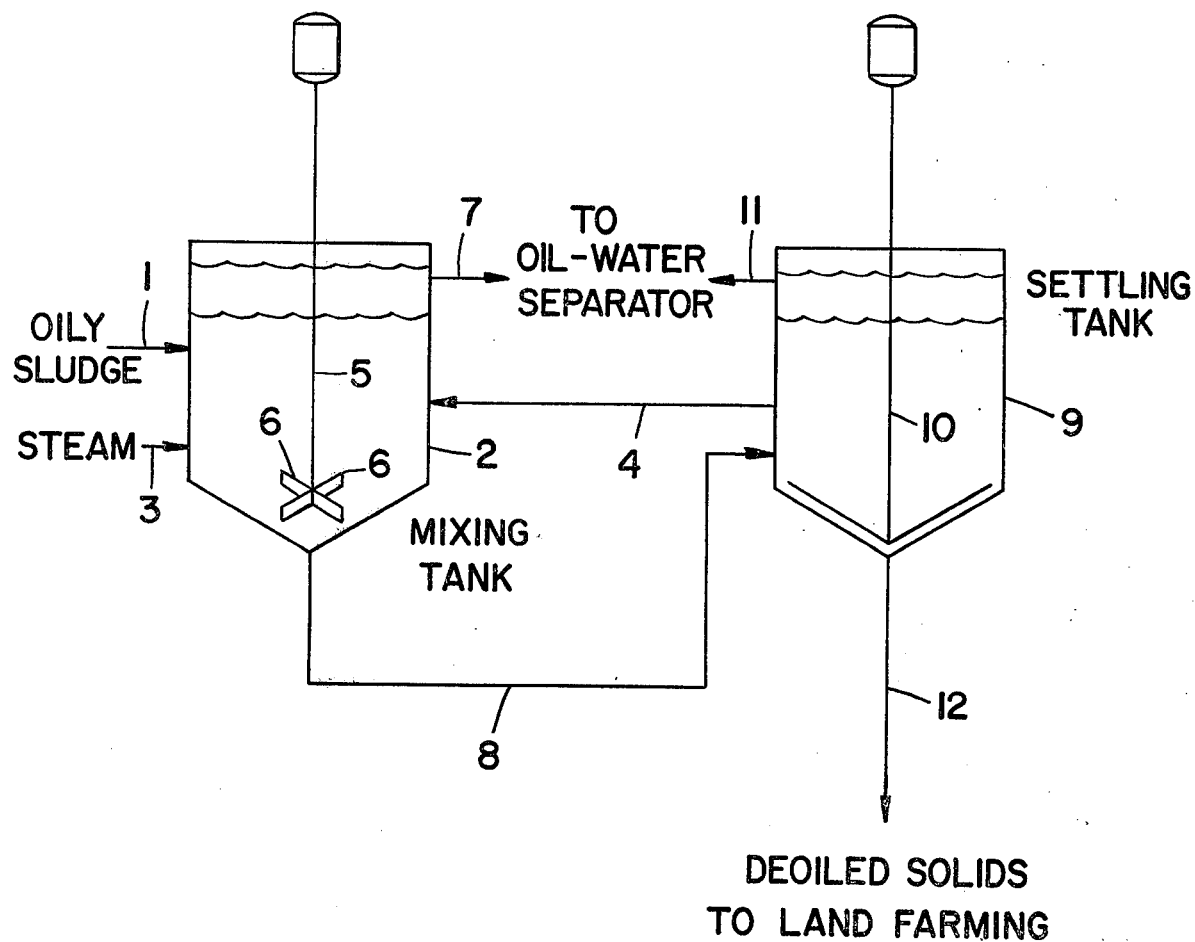

RECOVERING OIL FROM EMULSION BY STIRRING, HEATING, AND SETTLING

BACKGROUND OF THE INVENTION

1. Field of the Invention

This invention relates to a process for recovering oil and deoiled particulate solids from a sludge. More particularly, it relates to deoiling a sludge and disposing of the resulting sludge by land farming.

2. Description of the Prior Art

The economic processing of oily sludges for reuse of portions thereof and pollution-free disposal of residues poses a difficult problem. These sludges are usually stable emulsions containing water, oil and particulate solids, for example as produced as by-products in petroleum production and refining.

It is known to process an oily sludge, for example in a sump, by introducing steam therein, after which separated oil is skimmed from the surface and water is decanted from the sump, leaving an oily muck or mud residue. The latter is then removed from the sump in any suitable manner, for example by a suction pump, and is disposed of as desired. This process is unsatisfactory, for reasons including: (1) it is relatively passive in nature and undesirably time-consuming; and (2) results in a deoiled sludge which is much less satisfactory for disposal by the land-farming method.

Other methods for processing an oily sludge include diluting or mixing the sludge with a light hydrocarbon solvent, subjecting the sludge to high temperatures and pressures and the like, but these are, in general, unattractive methods for reasons of economy, explosion hazards incidental to handling light hydrocarbon solvents, liquid-liquid phase separation problems, and the like.

It is an object herein to provide an effective process for deoiling an oily sludge. A further object is to produce from an oily sludge a deoiled solid suitable for disposition thereof by the land-farming method. Other objects will be clear from the example and description below.

SUMMARY OF THE INVENTION

A process is provided for separating sludge containing oil, water and particulate solid, said sludge having, in parts by weight, a free-water content in the range of from about 4 to 50, preferably 10–25, parts per part of said solid, comprising:

(1) forming a first upper layer comprising oil or oil and water and a first lower layer comprising an aqueous suspension of said solid and residual oil by stirring said sludge while maintaining the resulting mixture at a temperature in the range above about 95° F. and below the boiling point thereof, and thereafter maintaining said mixture under sludge settling conditions for a period in the range of from about 0.5 to 24 hours and sufficient for said layers to form, said stirring expending for each 1000 gallons of said sludge an amount of mechanical energy in the range of from about 0.1 to 5 horsepower;

(2) withdrawing at least a portion of said first upper layer from said the resulting settled mixture (3) withdrawing at least a portion of said first lower layer from said vessel;

(4) separating said withdrawn lower portion into (i) a second upper layer comprising at least a portion of said residual oil, or said portion and water; and (ii) a second lower layer, said second lower layer having an upper zone comprising water substantially free of said solid and a lower zone comprising settled solid, the remainder of said oil, and water by maintaining said withdrawn portion under sludge settling conditions for a period in the range from about 0.5 to 48 hours;

(5) withdrawing at least a portion of said second upper layer from said settled withdrawn lower portion;

(6) withdrawing at least a portion of said upper zone from said settled withdrawn lower portion; and (7) withdrawing at least a portion of said lower zone from said settled withdrawn lower portion, said portion containing, based upon said settled solid, less than 30 weight percent of oil.

In a preferred aspect of the invention, the above-described process is carried out by recycling to the vessel at least a portion of the upper zone withdrawn from the settling zone, that is by carrying out the present process in a semi-continuous mode.

In another preferred aspect of the invention, the aforementioned process is carried out in a continuous mode wherein at least in part water used for diluting the sludge is at least a portion of the upper zone withdrawn from the settling vessel.

By sludge settling conditions as used herein is meant (1) a temperature in the range above 95° F. and below the boiling point of the sludge: and (2) little or no mixing.

Oily sludges in general are contemplated for use as feeds to the present process. Those which contain an amount of oil, based upon the solid content of the sludge, in the range above about 15 weight percent, are especially suitable feeds herein.

Oily sludges, usually emulsions, result from a wide variety of circumstances, for examples as by-products in processing chemicals, from accidental oil spills, in producing crude oil, in petroleum refining and the like. Sludges resulting from petroleum refining and producing operations are preferred feeds, especially the former. Refinery sludges comprise sediments from tank bottoms, waste chemicals, sand, clay, catalysts and fractions thereof, and corrosion products as well as water and oil. Solids ordinarily do not separate by simple gravity settling from sludges. Sludge compositions vary widely depending upon the particular source, for example sludges from tank cleaning, API separator bottoms, recovered oil tank bottoms, IAF (Induced Air Flotation) float separation tank bottoms, miscellaneous refinery sludges and mixtures thereof. Sludge compositions, in general, vary in the range of from mainly water and oil plus but a minor amount of solids to mainly water and solids plus a minor, but significant, amount for example about 10 weight percent and higher, of oil. These, in general, are especially satisfactory for use as feedstocks herein and are contemplated for this use.

Refinery sludges are emulsions or readily form oil-water-solid emulsions under ordinary working conditions. From descriptions of prior methods, it is evident that special conditions are required for the effective separation of these sludges into useful parts. For example, see U.S. Pat. Nos. 3,692,668, 3,696,021 and 3,835,021. Surprisingly, it has been found that under the conditions of the present invention these sludges are effectively separated into a useful oil or oily water fraction and a disposable aqueous, substantially deoiled sedimentary fraction.

The invention will be more fully described in the following detailed description taken in conjunction with the accompanying drawing, wherein:

The FIGURE is a process flow diagram illustrating a preferred embodiment of the invention.

DETAILED DESCRIPTION OF THE INVENTION

In a preferred embodiment, referring to the FIGURE, the process of the invention is carried out in a semi-continuous mode. Refinery sludge via line 1 and recycled water via line 4 are delivered to tank 2 in relative amounts sufficient to provide a mixture which contains about 15 parts of free and loosely held water (as contrasted with chemically bound water) per part of particulate solid. Depending upon the pH of the resulting mixture, a minor amount of mineral acid or caustic may be added, if desired, by any suitable means (not shown) to adjust the pH to a value in the relatively non-corrosive range, for example 7 to 8. While maintaining the contents of tank 2 at a temperature of about 150° F. by any suitable means, for example steam via line 3, the mixture is stirred moderately vigorously by variable-speed stirring element 5 containing 1 or more high-shear blades 6. The stirring is continued for a period sufficient to provide a mechanical energy input into the mixture at a rate of about 1 horsepower per 1000 gallons thereof, for example about a half-hour. Thereafter, the stirring is stopped or, if desired, continued at a slow rate while the mixture is settled, and liberated oil or oil and water is permitted to accumulate in an upper layer of the treated mixture. This upper layer is then withdrawn from tank 2 via line 7 for delivery to an oil-water separator, a slop-oil holding tank or the like for ordinary use or recovery as desired.

Via line 8 the residual mixture, the lower layer, in tank 2 is withdrawn and delivered to settling tank 9, which is fitted with a heating means, not shown, and a slow-speed bottoms scraper-mixing element, 10. While maintaining the temperature of the contents of tank 9 at about 140° F., the particulate solid, in large part, is permitted to settle over a period of about 2 hours. Concurrently, an upper layer of additional liberated oil or an oil-water forms, and as well a lower aqueous layer having an upper zone which is substatially free of solids, i.e., contains but little or no particulate solids. The upper layer is withdrawn from tank 9 via line 11 for the same or similar handling, as described for the recovered upper layer from tank 2. The upper zone of the aqueous layer is withdrawn from tank 9 via line 4 for recycle to tank 2, and the bottoms fraction thereof containing settled and deoiled solids is withdrawn, aided by rotation of the bottom scraper unit 10, via line 12 for disposal as desired, preferably by the land-farming method. In a typical treatment herein, the resulting substantially deoiled sludge, based upon the solid content thereof, contains less than about 10 weight percent of oil and is especially suitable for disposition by the land-farming or land-spreading method (see U.S. Pat. No. 3,835,021 and the paper by G. K. Dotson et al. presented at the Fifth International Water Pollution Research Conference and Exhibition, San Francisco, Calif., July 26 through Aug. 1, 1970).

Again referring to the FIGURE, another preferred embodiment, a continuous embodiment of the invention, will be understood from the following description. At a rate of about 100 BPOD, oily sludge is fed via line 1 to mixing tank 2. This sludge is a composite of ordinary API separator, tank bottom, settling pond, oil-spill cleanup, and miscellaneous refinery sludges. A typical such composite contains about 20 weight percent of finely divided particulate solids, about 50 weight percent of oil and about 30 weight percent of water. Via line 3 sufficient steam is introduced into tank 2 to maintain the temperature of the resulting mixture in the 125°–175° F. range. At a rate of about 150 GPM, recycled process water is introduced into tank 2 via line 4. If desirable, depending upon the presence in the sludge of significant amounts of relatively low-boiling hydrocarbons, noxious gases and the like, tank 2 may be a covered tank and may be fitted for controlled venting and recovery of such low-boiling materials. Tank 2 is a mixing tank and for this purpose is fitted with a suitable stirring means 5, for example a shearing stirring blade powered by a variable-speed electric motor. The mixing in tank 2 must be carried out at a rate sufficient for an input of about 1 horsepower of mechanical energy per 1000 gallons of sludge into the resulting mixture. As a result of a combination of factors, including the temperature of the resulting mixture, the mixing rate and gravitational effects, an oil or oily water upper layer develops in tank 2 as well as a lower layer comprising an aqueous suspension of solids and residual oil, if any. Via line 7 oily water is withdrawn from tank 2 at a rate of about 51 BPOD for delivery to an oil-water separator, not shown. Typically this upper layer contains about 80% oil, about 19% water and about 1% solids. Via line 8 the lower-layer component of the resulting mixture in tank 2 is withdrawn from tank 2 for delivery to settling tank 9 at a rate of about 150 GPM. Typically this suspension contains about 8 weight percent of solids, the balance being, in the main, water and a minor amount of residual oil. Via lines not shown, auxiliary water and steam as desired for make-up and heating are delivered to line 8 and the process. Desirably the suspension delivered to settling tank 9 via line 8 is at a temperature of about 140° F.

In settling tank 9 the suspension produced in tank 2 is separated by gravitational sedimenting into an upper layer comprising residual oil or oily water, an aqueous layer having an upper zone comprising water which is substantially free of particulate solids and a lower zone comprising settled solids and water. Typically, for a satisfactory separation in the settling tank, an average residence time in the range 1 to 2 hours is required. Settling tank 9 is fitted with a bottom scraper 10 which is rotated at a relatively low non-mixing speed for the purpose of facilitating the removal of a bottom layer of solids-water material from settling tank 9 via line 12. This material is removed at a rate of about 195 BPOD and contains about 10 weight percent of solids, 3 weight percent of oil, the balance being water. This material is suitable for incorporation in soil as in land farming wherein natural bacteria and the like readily convert the oil content thereof to more desirable soil components. Optionally, for example where the land to be farmed is located at a substantial distance from the sludge-treating plant, the effluent withdrawn via line 12 may be subjected to filtration, for example in a filter process, in order to reduce the cost of transporting the solids to a disposal site.

The residual oil or oily water layer produced in settling tank 9 is withdrawn via line 11 for delivery to an oil-water separator, not shown, for example an ordinary API water-oil separator. Water which is relatively free of solid material and present as an upper zone in the aqueous layer in settling tank 9 is withdrawn from tank 9 via line 4 for recycle to mixing tank 2.

In the disposal of oily sludge by the land-farming method, the sludge is usually spread to a depth of about 6 inches or is worked into the soil to a suitable depth by disking, plowing, and the like. If the sludge has an excessive oil content, upon settling and standing of the farmed sludge, oil separates and rises to the soil surface. The pollution aspects of such a result are obvious, including contamination of run-off waters and the like. In addition, the presence of excessive oil in the soil inhibits or prevents the desired conversion of oil by oil-consuming soil bacteria, thereby forming more desirable soil components. For effective disposition of oily sludge by land farming, the sludge should have an oil content, based on the solid content thereof, in the range below about 30 weight percent, and more preferably below about 10 weight percent. Otherwise, the required land area becomes excessive and the method is less satisfactory.

For effective deoiling or treating of an oily sludge, especially of a refinery sludge, a combination of conditions is required which includes heating and stirring, the latter being effected with an appreciable input of mechanical energy, for example an amount in the range of from about 0.1 to 5 or more, preferably 0.5 to 2, horsepower per 1000 gallons of sludge. In addition to the foregoing process factors, diluting of the sludge with added water, for example water recycled from the process settling zone, usually promotes a more effective treatment. In a preferred aspect of the invention, the raw sludge is diluted with an amount of added water in the range of from about 0.3 to 10 or more, preferably 2 to 7, volumes per volume of sludge.

The temperature required for the processing of the sludge varies depending upon a number of factors, including (1) the stability of the emulsion, (2) the viscosity of the oil, and (3) the intensity of the mixing. In general, the more stable the emulsion and the more viscous the oil, the higher must be the temperature in order to achieve a satisfactory separation. Usually, satisfactory mixing and settling temperatures, as contemplated herein, are in the range above about 95° F. and below the boiling point of the liquid portion of the sludge. Preferred process temperatures are in the range of from about 120° F. to 185° F.

The intensity of the mixing required herein varies depending upon a number of factors, including (1) the amount of solids in the emulsions, (2) the degree, if any, of dilution, (3) the viscosity of the oil, and (4) the stirring means. As a result of mixing, a shearing or wiping force is generated. This force, which is proportional to the horsepower input, tends to disengage oil from the emulsion, thereby permitting oil or oil-water composites in the interior portions of the emulsion to migrate to the upper surface. For an effective separation, at least some mixing is necessary. However, it has been found that when the intensity of the mixing of a diluted and heated oily sludge is excessive, the desired separation does not occur and may result in a redistribution of the oil, water and solid into a new emulsion and, at times, the production of a relatively minor separated phase. In general, a suitable and useful separation occurs, in terms of horsepower input of mechanical energy, when this input is in the aforementioned range.

The time required for mixing and settling herein varies depending upon a number of factors, including (1) the particular sludge being treated and (2) the combination of temperature and intensity of the mixing employed. In general, the time needed to achieve satisfactory mixing is in the range of from about 0.1 to 10 hours, preferably 0.5 to 1 hour, and for satisfactory settling is in the range of from about 0.5 to 24 hours, preferably 2 to 5 hours. When the process is carried out in the continuous mode, the sizes of the mixing and settling vessels are desirably adjusted to achieve corresponding residence times, taking into consideration, in the usual way, the recycle rate for recycled water, if any, from the intermediate layer and the like factors.

If desired, one or more additives, known for their tendency for breaking emulsions, may be introduced into the sludge during the heating and stirring stage (see, for example, "Emulsions and Foams" By S. Berkman and G. Egloff, pps. 308–315, Rheinhold Publishing Co., N.Y.).

What is claimed is:

1. A process for treating sludge containing oil, water and particulate solid, said sludge having, in parts by weight, a free-water content in the range of from about 4 to 50 parts per part of said solid, comprising:
    (1) forming a first upper layer comprising oil or oil and water and a first lower layer comprising an aqueous suspension of said solid and residual oil by stirring said sludge while maintaining the resulting mixture at a mixing temperature in the range above about 95° F. and below the boiling point thereof, and thereafter maintaining said mixture under sludge settling conditions including a settling temperature in the range above 95° F. and below the boiling point thereof for a period in the range of from about 0.5 to 24 hours and sufficient for said first layers to form, said stirring expending for each 1000 gallons of said sludge an amount of mechanical energy in the range of from about 0.1 to 5 horsepower;
    (2) withdrawing at least a portion of said first upper layer from the resulting settled mixture;
    (3) withdrawing at least a portion of said first lower layer from said resulting settled mixture;
    (4) separating at least a portion of said withdrawn portion of said first lower layer into (i) a second upper layer comprising at least a portion of said residual oil, or said portion and water; and (ii) a second lower layer, said second lower layer having an upper zone comprising water substantially free of said solid and a lower zone comprising settled solid, the remainder of said residual oil, and water by maintaining said withdrawn portion of said first lower layer under sludge settling conditions for a period in the range from about 0.5 to 48 hours;
    (5) withdrawing at least a portion of said second upper layer from the resulting settled withdrawn portion of said first lower layer;
    (6) withdrawing at least a portion of said upper zone from said settled withdrawn lower portion and returning at least a portion of it to said first lower layer, and
    (7) withdrawing at least a portion of said lower zone from said settled withdrawn lower portion, said portion of said lower zone containing, based upon said settled solid, less than 30 weight percent of oil.

2. A process as in claim 1 wherein (1) said sludge has an oil content, based upon said solid, of at least 15 weight percent; (2) said free-water content is in the range of from about 10 to 25 parts per part of said solid; (3) said stirring is continued for a period in the range of from about 0.1 to 10 hours; (4) said stirring energy is in the range of from about 0.5 to 2 horsepower; and (5) said stirring is carried out at a temperature in the range of from about 120° F. to 185° F.

3. A process as in claim 1 wherein (1) said sludge is a water-diluted sludge; (2) said stirring is continued for a period in the range of from about 0.5 to 1 hour; and (3) said temperatures, mixing and settling, are in the range of from about 120° F. to 185° F.

4. A process in claim 1 wherein said treating is carried out semi-continuously.

5. A process as in claim 1 wherein said stirring is carried out using a shearing stirring unit.

6. A process as in claim 1 wherein said withdrawn lower zone portion from said settled withdrawn lower portion is delivered for land farming.

7. A process as in claim 1 wherein (1) said stirring is carried out in a first tank by means of a shearing stirring unit; and (2) said settling of said withdrawn lower portion is carried out in a second tank.

8. A process as in claim 7 wherein said tanks are covered tanks.

* * * * *